(12) United States Patent
Naylor

(10) Patent No.: US 6,629,315 B1
(45) Date of Patent: Sep. 30, 2003

(54) METHOD, COMPUTER PROGRAM PRODUCT, AND SYSTEM FOR DYNAMICALLY REFRESHING SOFTWARE MODULES WITHIN AN ACTIVELY RUNNING COMPUTER SYSTEM

(75) Inventor: Bruce E. Naylor, Morgan Hill, CA (US)

(73) Assignee: International Business Machines Corporation, armonk, NY (US)

( * ) Notice: Subject to any disclaimer, the term of this patent is extended or adjusted under 35 U.S.C. 154(b) by 586 days.

(21) Appl. No.: 09/637,842

(22) Filed: Aug. 10, 2000

(51) Int. Cl.$^7$ .................................................. G06F 9/44
(52) U.S. Cl. ...................................... 717/168; 713/100
(58) Field of Search .................... 713/100; 717/168–173

(56) References Cited

U.S. PATENT DOCUMENTS

| | | | |
|---|---|---|---|
| 5,386,567 A | 1/1995 | Lien et al. | 395/700 |
| 5,579,491 A | 11/1996 | Jeffries et al. | 395/283 |
| 5,625,777 A | 4/1997 | Takahashi et al. | 395/283 |
| 5,784,576 A | 7/1998 | Guthrie et al. | 395/283 |
| 5,834,856 A | 11/1998 | Tavallaei et al. | 307/64 |
| 5,941,994 A | 8/1999 | DeKoning et al. | 714/7 |

OTHER PUBLICATIONS

IBM OS/390 MVS Initialization and Tuning Guide $7^{th}$ Edition, Mar. 1997.

IBM OS/390 MVS Programming: Authorized Assembler Services Guide $9^{th}$ Edition, Sep. 1999.

*Primary Examiner*—Thomas M. Heckler
(74) *Attorney, Agent, or Firm*—Gregory M. Plow

(57) ABSTRACT

A method, computer program product, and system for dynamically refreshing software modules within an actively running computer system is provided. An existing module or multiple modules (recognizable units of executable code) is ready for execution in an active computer system. New modules corresponding in function to the existing modules are loaded into the computer system memory for the purpose of updating the existing modules. The new modules are prepared for execution by pointing to corresponding state data currently being used by the existing modules and otherwise made ready to take over execution. A lock is held on execution exclusively be the refreshing process for a relatively brief moment in order to switch access from the call point or call references from the existing modules to the new modules. The lock is released now allowing execution of the new modules with the existing data thus accomplishing the update or refresh of the modules. Finally, the previous or "old" modules are removed from memory.

36 Claims, 4 Drawing Sheets

METHOD, COMPUTER PROGRAM PRODUCT, AND SYSTEM FOR DYNAMICALLY REFRESHING SOFTWARE MODULES WITHIN AN ACTIVELY RUNNING COMPUTER SYSTEM

BACKGROUND OF THE INVENTION

1. Field of the Invention

The present invention relates to systems and methods for managing executing program code or modules. More specifically, the invention relates to ways of changing or updating the executing program code or modules without requiring a shutdown and restart of the executing code or otherwise minimizing the performance or downtime impact of updating software.

2. Present State of the Art

There exist high availability computer programs running on very reliable computer systems for many important applications. These systems and programs typically run 24 hours a day, 7 days a week, and any interruption to processing can represent have serious repercussions in terms of customer service and, in some situations, safety.

For example, the advent of electronic commerce over the Internet and World Wide Web requires that e-commerce websites always be available for processing transactions. Other examples include credit card transaction processing applications, air traffic control applications, etc. One example environment where high availability is important that will be used throughout are applications built using the IMS system available from IBM, Corp., Armonk, N.Y.

As software for such critical applications is enhanced "off-line" on development environments, it becomes necessary to deploy or refresh such enhanced software "on-line" into the production environment. Previous ways of deploying such enhancements has required saving state data, shutting down or otherwise impairing the availability of the critical application, installing the new software, and then restarting the application or otherwise making it fully available. At this point, the application would be running the enhanced code with the existing data.

By shutting down the system or other performance impacting event, such as a manual quiescing of the system, service is disrupted. Therefore, there exists a need to apply changes (enhancements and/or maintenance) to one or more modules of software within an actively-running system without requiring a shutdown or interruption of that system. Furthermore, there exists a need to add or delete such modules within an actively-running system.

When updating modules on a running system, the updating would need to preserve state information from previous instances of the changed modules and to provide this information to the new instances of these modules. Furthermore, the need exists to ensure that the refreshing of a set of modules is done atomically (either all are refreshed or none are refreshed).

The IBM OS/390 operating system has a function called Library Look Aside/Virtul Look Aside Facility (LLA/VLF) that manages modules in memory and can refresh the in-storage copies of the modules. However, the modules loaded by LLA/VLF are kept in memory for the purpose of facilitating faster module loading when requested by another address spaces. This is analogous to an in-memory cache of modules that will be requested from more permanent storage. Because the modules are pre-loaded, the request can be quickly serviced. It is important to note that the pre loaded copies of the modules are not themselves executed directly.

As such, while LLA/VLF can refresh modules in storage, it does not also control execution of them by running units of work. Programs using modules managed by LLA/VLF would still have to shutdown and restart to execute updated modules.

SUMMARY OF THE INVENTION

One aspect of the present invention allows a set of modules to be dynamically refreshed, added, and deleted in an actively-running computer program.

Another aspect of the invention provides that no active units of execution are running in the modules when they are being refreshed and further assures that all modules involved are successfully refreshed, or else none of them are (atomic refresh).

Yet another aspect of the invention preserves state information from previous instances of a module and makes that information available to a new instance of the module.

Further aspects of the invention minimize the disruption to a running computer system by not requiring a system shutdown or manual quiesce to replace the modules and by pre-loading and initializing all modules being refreshed prior to stopping access to the previous instances of the modules, and then only keeping the module access blocked for the time it takes to swap in pointers to the new modules into control blocks.

When the present invention is invoked to refresh or update one or more modules on an active computer system, the new module(s) are loaded into memory and initialized or otherwise made ready for execution. This include pointing the new replacement modules to the state data, data structures, etc. already being used by the corresponding existing modules and creating the necessary data structures, data blocks, etc for any absolutely new modules that may be added.

Once the new modules are in a state of readiness, a lock is taken by the refreshing process over execution of the module(s) so that all other processes, threads etc. are no longer executing the existing modules and no new processes, threads, etc. may start executing.

The lock is held only long enough to make the association from the calling point (where threads, processes, etc. gain access to the subject modules) to the new modules instead of the existing or old modules. Any waiting for processing is minimized to this relatively brief moment which has minimal impact.

Finally, the lock is released, execution continues using the new modules, and the old modules are discarded thus freeing up memory resources.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope. With respect to the following drawings, like reference numbers denotes the same element throughout the set of drawings.

FIG. 4A is the logical diagram in an initial state. FIG. 4B is the logical diagram after new modules have been installed along with a corresponding set of instance blocks and prior to taking an exclusive lock to serialize the refresh process. FIG. 4C is the logical diagram after the new modules point to the corresponding state data in the existing modules through use of the module instance block and after taking an exclusive lock to serialize the refresh process. FIG. 4D is the logical diagram after the module type block has been associated with the new set of module instance blocks. FIG. 4E is the logical diagram after the exclusive lock is released so that normal processing may resume and the "old" modules and corresponding instance blocks have been removed.

DETAILED DESCRIPTION OF THE INVENTION

As used herein, the term "module" or "software module" means to a piece of computer code that is independently loadable from long-term storage media (such as, but not limited to, a disk drive, CD-ROM, tape, etc.). "Module" incorporates many commonly known terms such as subroutines, processes, Dynamic Link Libraries (DLLs), etc.

As used herein, the term "module type" means the specification of the function of a module or a point where a module is given control. A module is associated with a module type. A module type may have a one-to-one or a one-to many association with individual modules. For example: a module type might be an "initialization routine". There may be two modules of type "initialization routine": INITRTN0 and INITRTN1.

As used herein, the term "call point", "call point access" or "call references" refers to a point in program execution where a module or modules of a given module type are given control (called). This also refers to the use of an Application Programming Interface (API) which turns execution over to a specific module or subroutine. When a call point for a module type is reached, the modules associated with that module type are called in a particular order.

As used here, the term "system", "system services" or "subsystem" refers to a collection of programs, modules, other software, combinations of hardware and software, etc. designed to perform some function or service. Example of systems include: a transaction manager, a data base manager, a queue manager.

As used herein, the term "state data" refers to any data that is operated on or manipulated by a module separate from the module itself. Examples include: data structures passed by reference to a subroutine, data blocks, control blocks of data, etc.

Figure 1:
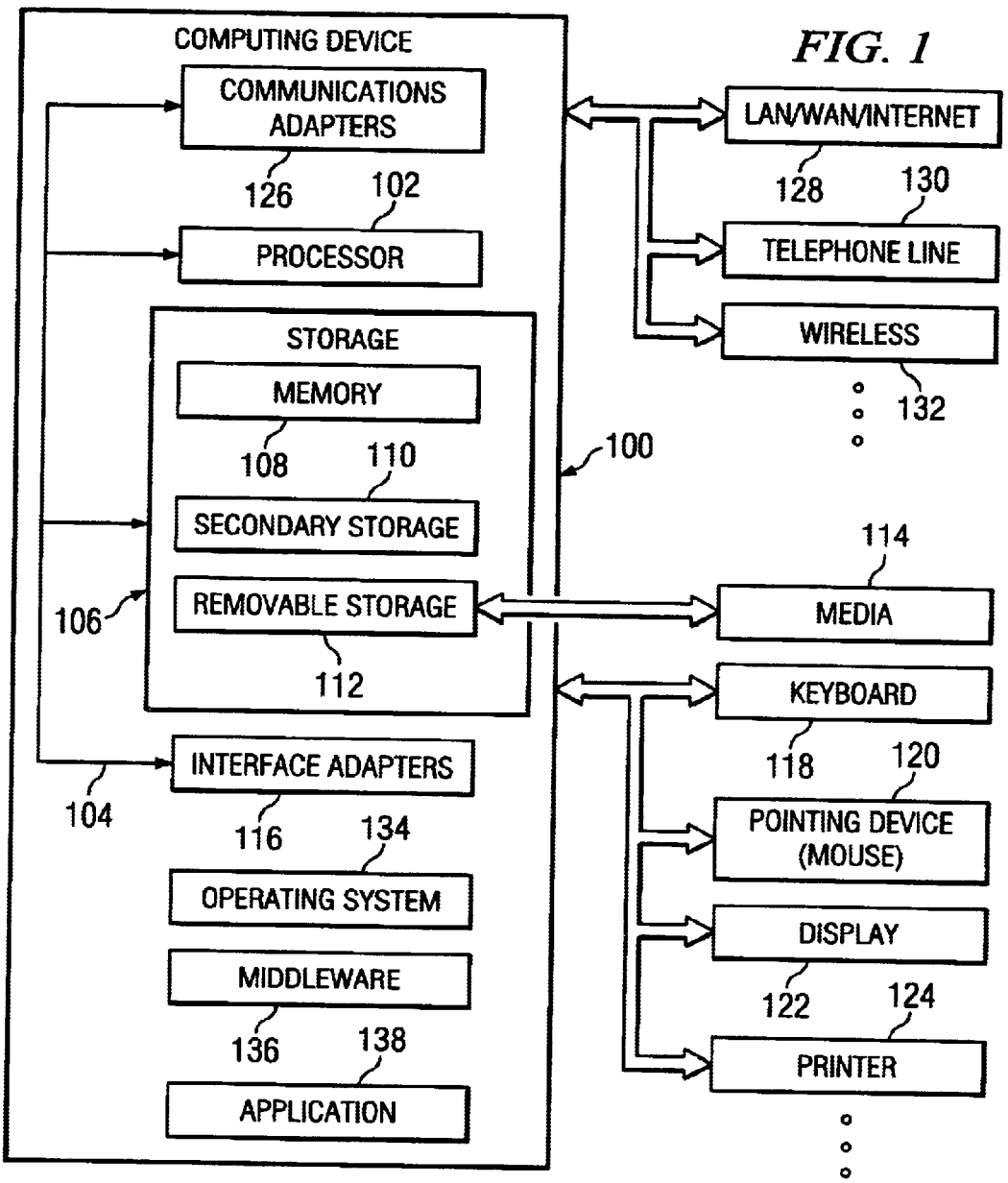
FIG. 1 is a block diagram of a generic computing device, that could be a workstation, server, mainframe computer, etc., wherein the present invention may be practiced.

FIG. 1 is a block diagram of a computing device, such as a workstation, wherein the present invention may be practiced. The environment of FIG. 1 comprises a single representative computing device 100, such as a personal computer, workstation, enterprise mainframe computer, server, laptop, hand-held computer, information appliance, etc., including related peripheral devices. The computing device 110 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 10 may have multiple memories (e.g., RAM and ROM), secondary storage devices, and removable storage devices (e.g., floppy drive and CD ROM drive).

The computing device 100 typically includes a user interface adapter 116 that connects the microprocessor 102 via the bus 104 to one or more interface devices, such as a keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, ISDN Adapter, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

The computing device 100 provides the facility for running software, such as Operating System software 134, Middleware software 136, and Application software 138. Note that such software executes tasks and may communicate with various software components on this and other computing devices.

As will be understood by one of ordinary skill in the art, computer programs such as that described herein (including Operating System software 134, Middleware software 136, and/or Application software 138) are typically distributed as part of a computer program product that has a computer useable media or medium containing or storing the program code. Therefore, "media", "medium", "computer useable medium", or "computer useable media", as used herein, may include a computer memory (RAM and/or ROM), a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The packet, as described above, is a data structure and has a tangible embodiment in a computer useable medium when stored in a file, when loaded into system memory, when transported across a communications network, etc. in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, a general purpose computing device as described in FIG. 1 may be configured with appropriate software so that the computing device functions as described hereafter. Furthermore, discrete electronic components may be used to create a system that implements all or part of the functional. Finally, note that combinations of multiple computing devices running appropriate software or discrete electrical components can be used in like fashion. Essentially, the hardware is configured (whether by software, custom designed, etc.) to perform the functional elements making up the present invention.

Figure 2:
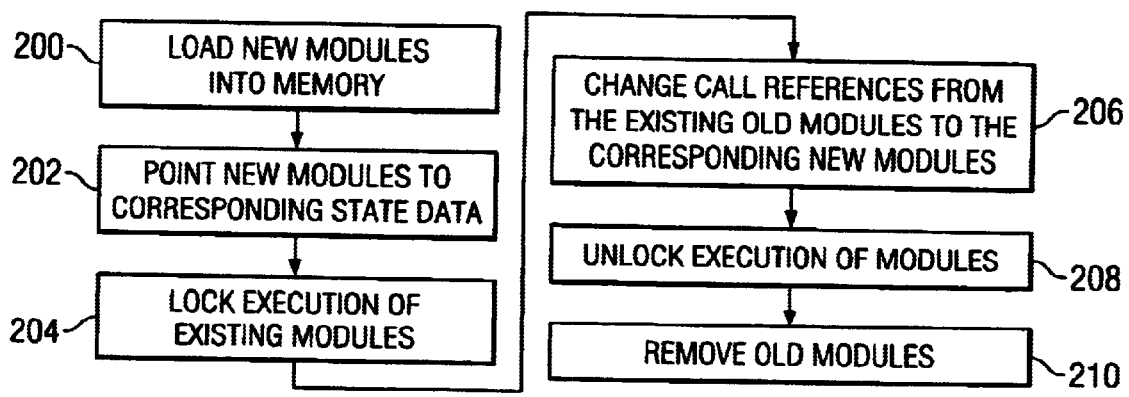
FIG. 2 is a flow showing the steps taken in order to carry out one one embodiment of the invention.

Referring to FIG. 2 a flow chart showing the processing steps for one embodiment of the present invention is shown. Initially, at step 200, the new modules are loaded into memory in preparation for execution. For example, a new subroutine accessible over a standard API might be loaded. Note that there is an existing and functionally corresponding subroutine already loaded and being executed when called.

At step 202, the new module or modules are "pointed" to the state data in memory that the existing module(s) are using. In other words, there is data associated with the existing module and this exact same data is now made available to the new modules. For example, data structures or data blocks used by an existing subroutine that are accessed by a passed pointer, would be associated with the new subroutine by using the same passed pointer address.

At this point, it is important that things be in a known state (i.e., the state data will not change). Therefore, the execution of the existing modules is locked from new executions at step 204. Existing executions should complete before the lock is granted to insure that no additional changes will be made to state data. For example, any threads or processes desiring to execute an existing subroutine that is subject to an execution lock will be blocked until the lock is released while those that may be currently executing when the lock was requested may be allowed to finish before the lock is actually granted.

The switch from the existing modules to the new modules occurs when the call references are changed at step 206. This entails rerouting requests for the existing modules so that they are handled by the new modules. For example, when execution is turned over to a new subroutine, operating system mechanisms are set up to place the starting address of the new subroutine on the invocation stack in place of the initial address of the existing subroutine.

At this point, everything is in place for the new modules to carry on execution and the execution lock is removed at step 208 and the "old" existing modules may be removed from memory.

Figure 3:
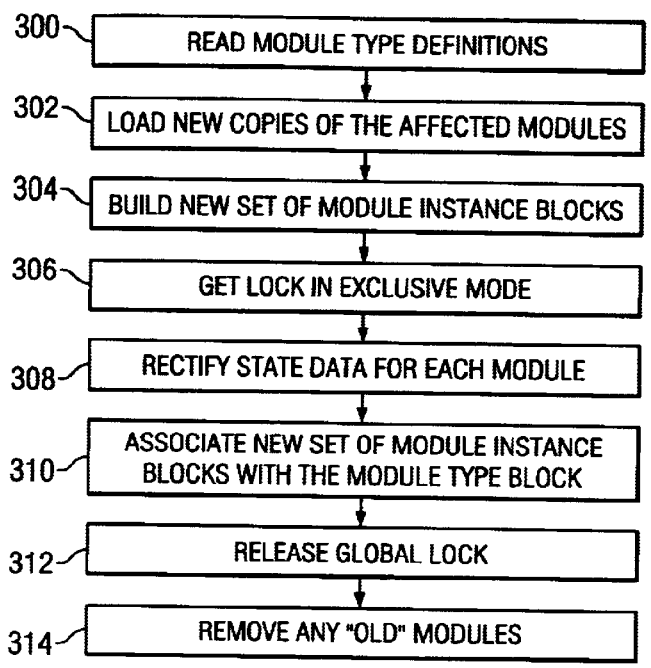
FIG. 3 flow chart showing the steps taken in order to carry out another embodiment of the present invention as implemented in the Base Primitive Environment (BPE) of an IBM IMS system.

Referring to FIG. 3, a flow chart showing the steps taken in order to carry out another embodiment of the present invention as implemented in the Base Primitive Environment (BPE) of an IBM IMS system is presented. FIGS. 4A through 4E are logical diagrams showing the updating of modules over time according to the steps in FIG. 3.

Initially, modules are associated with their module types through a definition mechanism. This mechanism enumerates each module type and the individual modules associated with it. The order in which the modules are listed for each module type is the order in which the modules are called when a call point for that module type is reached. This definition information is kept in a storage medium (typically, in a file on a disk drive) which may be changed as needed during program execution. An example of this is a text definition file which can be edited as required to change module type and module associations.

When a system is started, its definitions for module types and modules are read, and an in-memory representation of these definitions is built. An area of storage is obtained for each module where it can save state information that it needs to preserve from one call to the next. A possible in-memory representation is shown in FIG. 4A.

Figure 4A:
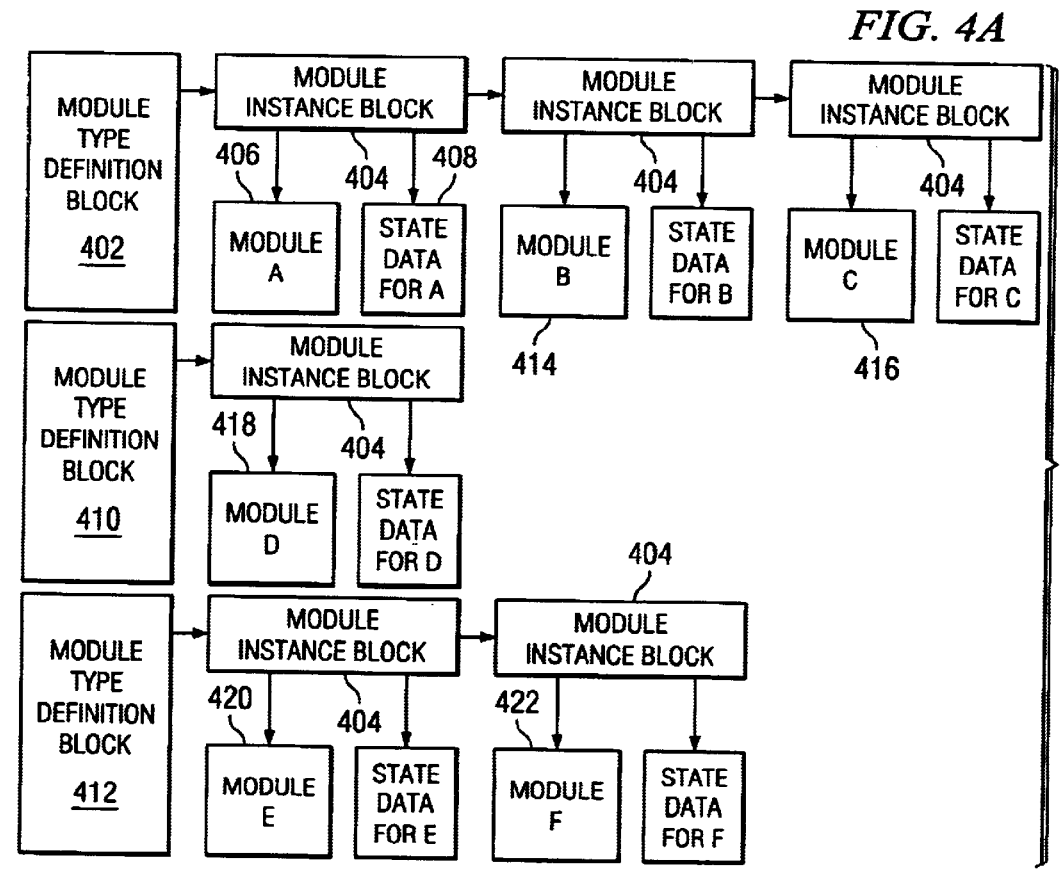
FIGS. 4A through 4E are logical diagrams at different points in time showing modules and data in an environment according to the implementation of FIG. 3.

Referring now to the initial state shown in FIG. 4A, each module type is represented by a module type definition block, such as module type definition block 402. Each module associated with a module type is represented by a module instance block, such as module instance block 404.

Module instance blocks are chained off of their associated module type definition block. Where there is more than one module associated with a module type, the order in which the module instance blocks are chained determines the order in which the modules are called when the module type's call point is reached. Each module instance block points to its associated module, such as module A 406. Each module instance block also points to a state data area, such as state data A 408, assigned to the module.

As shown in FIG. 4A, there are three module types, as represented by module type definition blocks 402, 410, and 412, respectively. The first module type has three modules associated with it: module A 406, module B 414, and module C 416. The second module type has a single module associated with it: module D 418. Finally, the third module type has two modules associated with it: module E 420 and module F 422.

When a call point for a particular module type is reached, the system locates the module type definition block for the module type being called, and traverses the chain of module instance blocks, calling each module in turn. Each module receives the address of its state data as an input parameter. Because the state data is preserved from call to call, each module can save information in this area and can retrieve it on subsequent calls.

The calling of the modules for a given module type is serialized by obtaining a lock global to all module types being managed in shared mode. Such a lock is a well-known serialization mechanism which allows multiple units of work to own the lock simultaneously in shared mode, but allows only a single unit of work to own it in exclusive mode. During normal processing, this lock is only obtained in shared mode, and so is nearly always available (so it does not impede the calling of the modules).

Using the above control block structure, along with the global lock, it is possible to refresh the modules associated with one or more module types. "Refresh" in this context includes any of the following:

Reloading new, potentially changed copies of each module associated with a module type;

Changing the calling order of the modules for a module type;

Adding new modules associated with a module type; or

Deleting existing modules associated with a module type.

The module refresh process as shown in the flow chart of FIG. 3 may be initiated via an external input (for example, a command) or by an internal condition detected within the system.

Referring to FIG. 3, the module refresh process re-reads the definition information for the module types that are being refreshed at step 300. This allows changes to be made to the list of modules associated with each module type, including changing the order of the modules, adding new modules, and deleting modules.

At step 302, the module refresh process loads new copies of the affected modules into storage. These modules may have been modified since they were originally loaded, or they my be unchanged. The new copies are loaded at new memory locations.

Next, at step 304, the module refresh process builds new sets of module instance blocks pointing to the newly-loaded modules. Note that each new set of module instance blocks will be chained together in the order that is currently specified in the definition information (i.e., could be different from the original order).

A global lock is obtained in exclusive mode at step 306. By definition, this means that there cannot be any owners of the lock in shared mode after this point (the refresh process is blocked from execution until any currently-running shared owners release the lock). Owning the lock in exclusive mode at this point prevents units of work from running in the modules until after the refresh completes.

Next, at step 308, addresses of state data for common modules found in both the old and new chains are made accessible to the new modules. Both the old and the new chains of module instance blocks are scanned, identifying each unique module that is present in both lists. For such modules, the module refresh process moves the addresses of the old modules' state data areas to the new module instance blocks. This preserves the state information for the new copies of the modules. For each module in the new module instance block chain that was not in the old module instance block chain, it obtains a new state data area.

At step 310, the new chains of module instance blocks are placed onto their respective module type definition blocks.

Now ready for execution, the global lock is released at step 312. At this point, calls to the modules are allowed to resume, and they will be made to the newly-loaded modules.

Finally, the storage associated with the old modules, their module instance blocks, and any state data areas for modules that were deleted (removed from being associated with a module type) as part of the refresh is freed at step 314.

This process provides for the atomic updating of all modules of the selected module types. Because of the serialization obtained in step 306, it is not possible for any other units of work to be executing in the old modules at the time the new modules are made active. Because the new modules are all loaded and a new module instance block chain is built before making the new modules active, any failures loading modules or allocating storage can be handled by aborting the refresh process prior to step 310. If a failure occurs during steps 300 through 308, the refresh fails, the global lock is released, and the old modules remain in effect. If a failure occurs after step 310, the new modules are already in place, and the refresh is essentially finished, except for cleanup of old modules and control blocks.

The only place where a failure would cause an inconsistent set of modules to be active would be during step 310, when the new chains of module instance blocks are chained off of the module type definition blocks—failure here will force the termination of the system to avoid integrity issues due to a mismatch of modules. Note that failure here is unlikely, as there are no resources being allocated that could fail due to lack of resources.

A further optimization is possible if it can be guaranteed that there is ever only a single refresh process executing at any one time. If this is true (meaning there is only a single updater of the control block chains), then the obtaining of the lock in exclusive mode can be delayed until after the state data has been rectified in step 308. This reduces the amount of time that is spent running with the exclusive lock held, including the time spent allocating any new state data areas.

In an environment where there can be multiple refresh processes executing concurrently, one way to obtain the benefit of this optimization is to introduce a second lock. For discussion purposes, let us refer to the original lock as the "call lock", and this new second lock as the "refresh lock". The refresh lock would be obtained in exclusive mode sometime prior to step 308. It would only be obtained by refresh processes, not by the processes that are calling the modules. The call lock would continue to be obtained in shared mode by the callers of the modules. It would be obtained in exclusive mode by the refresh process between steps 308 and 310 as outlined in the previous paragraph. The call lock would be released at step 312; the refresh lock could be released any time at step 312 or later.

Figure 4B:
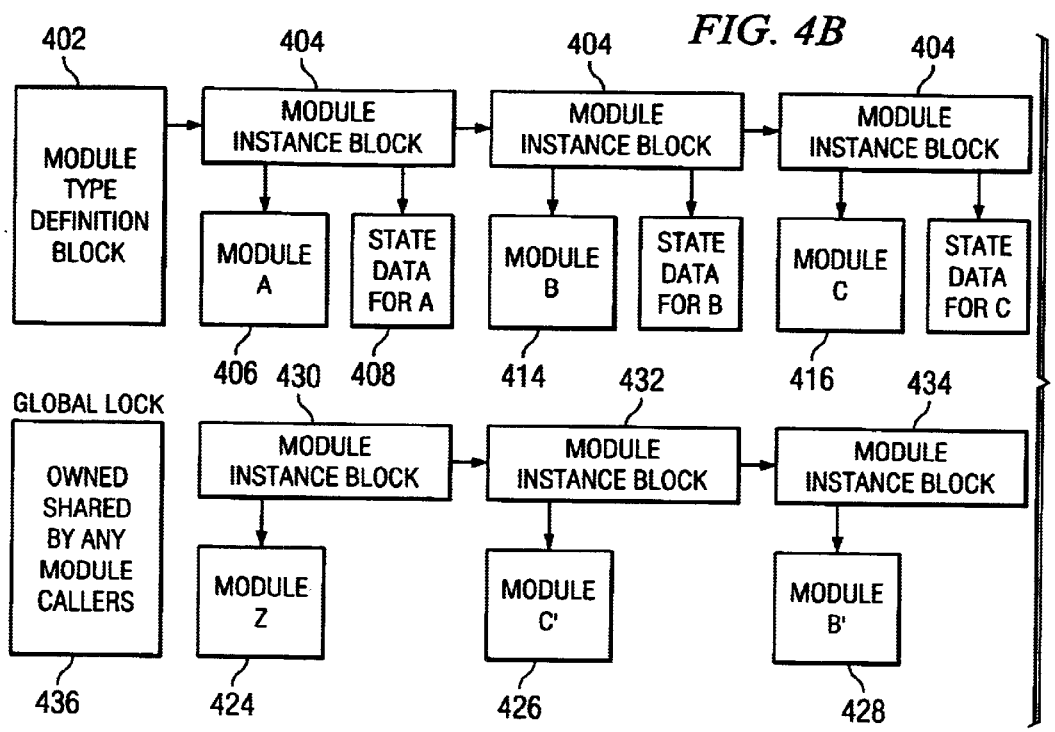

Referring now to FIG. 4B, the modules associated with the first module type definition block (namely, module type definition block 402) in FIG. 4A are to be refreshed. The original set of modules are module A 404, module B 414, and module C 416. Assume that the definition information has been changed to specify a new ordered module set of Z, C', B'. The effect of this change in the definition information causes A to be deleted, Z to be added, B and C to be updated with B' and C' respectively, and the order of B and C relative to one another to be changed from B, C to C, B.

The definition information is read in step 300 as part of refresh processing. Next, module Z 424, module C' 426, and module B' 428 are loaded into memory at step 302. This is followed by the creation of module instance block 430, module instance block 432, and module instance block 434 along with the respective associations with the modules themselves at step 306. After steps 300, 302, and 306 above, have been executed with respect to the initial state represented by FIG. 4A, the in-memory representation of the old and new modules appears as shown in FIG. 4B.

At this point, the new module Z 424, and new copies of C and B (module C' 426 and module B' 428) have been loaded into memory, and new module instance blocks 430, 432, and 434 for them have been built.

The global lock 436 is still available to module callers in shared mode. This will allow multiple callers to still access the module type block and run the old copies of modules A, B, and C (module A 406, module B 414, and module C 416, respectively).

Figure 4C:
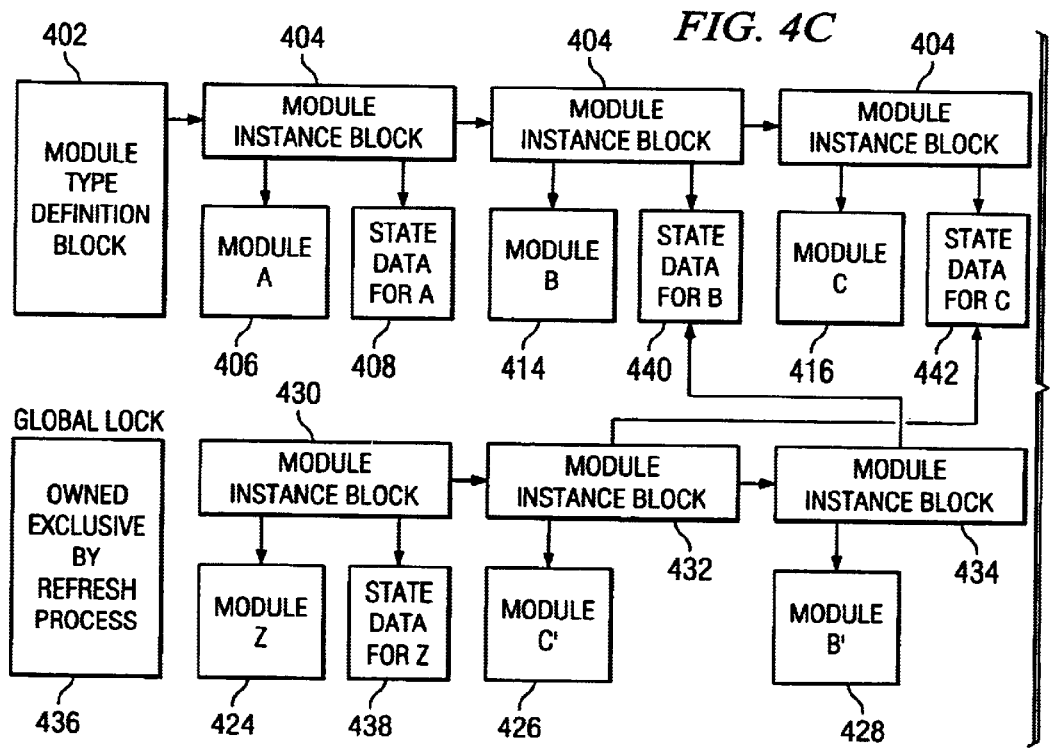

At step 306, the global lock 436 is acquired in exclusive mode by the refreshing process. This guarantees that there will be no activity within the any of the modules that could change state data or leave state data in an unknown state. Next, at step 308, access to the state data for the module C' 426 and the module B' 428 is made as indicated by the connecting lines between the state data and respective module instance block as shown in FIG. 4C. After steps 306 and 308 in the refresh process have run, the in-memory representation of the old and new modules appears as shown in FIG. 4C.

At this point, the refresh process owns the global lock 436 in exclusive mode. This prevents any callers from executing the modules—either the old or the new modules. A new state data area, state data Z 438, has been obtained for the new module Z 424. The module instance blocks for the new copies of modules C (module C' 426) and B (module B' 428) have been updated to point to the previously-existing state data for modules C and B, namely, state data B 440 and state data C 442.

Figure 4D:
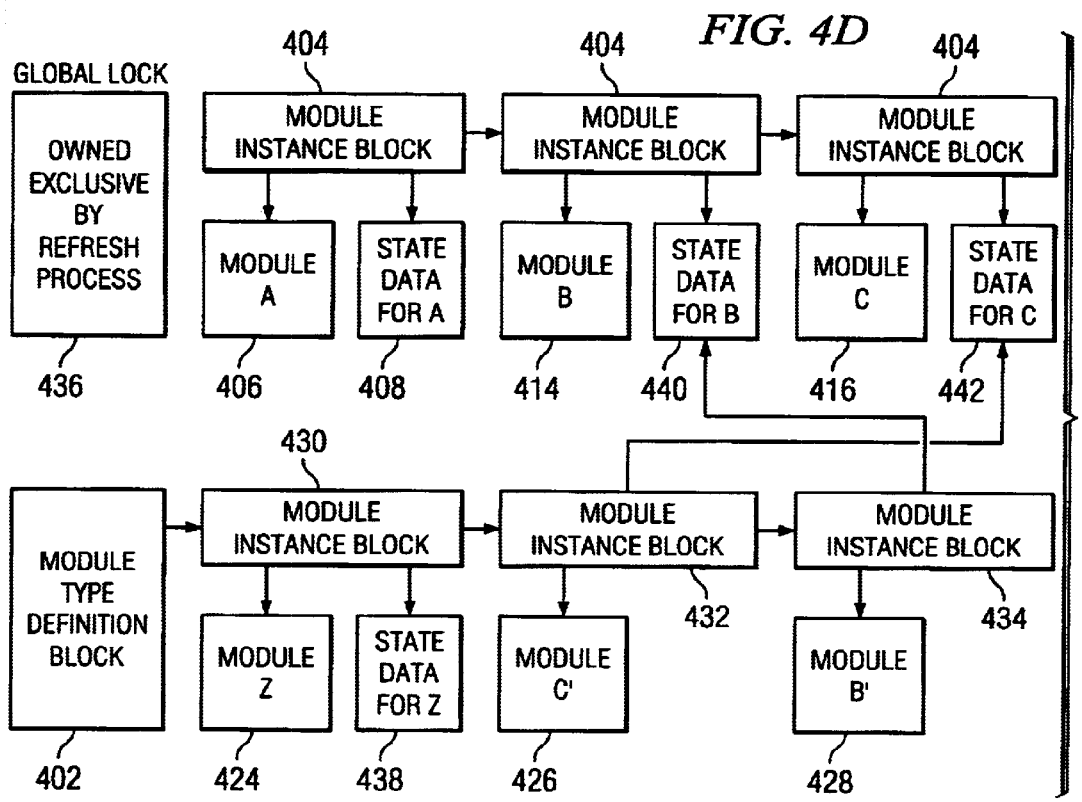

Referring now to FIG. 4D, the refresh process associates the new set of module instance blocks (module instance blocks 430, 432, and 434) with the module type definition block 402 at step 410. This also takes the previous module instance blocks out of the execution stream. After step 410 in the refresh process has run, the in-memory representation of the old and new modules appears as in FIG. 4D.

The execution of step 410 places the new module instance blocks (and thus, the new modules) on the module type definition block 402. From this point on, the new modules will be executed when the call point for their associated module type is reached.

Figure 4E:
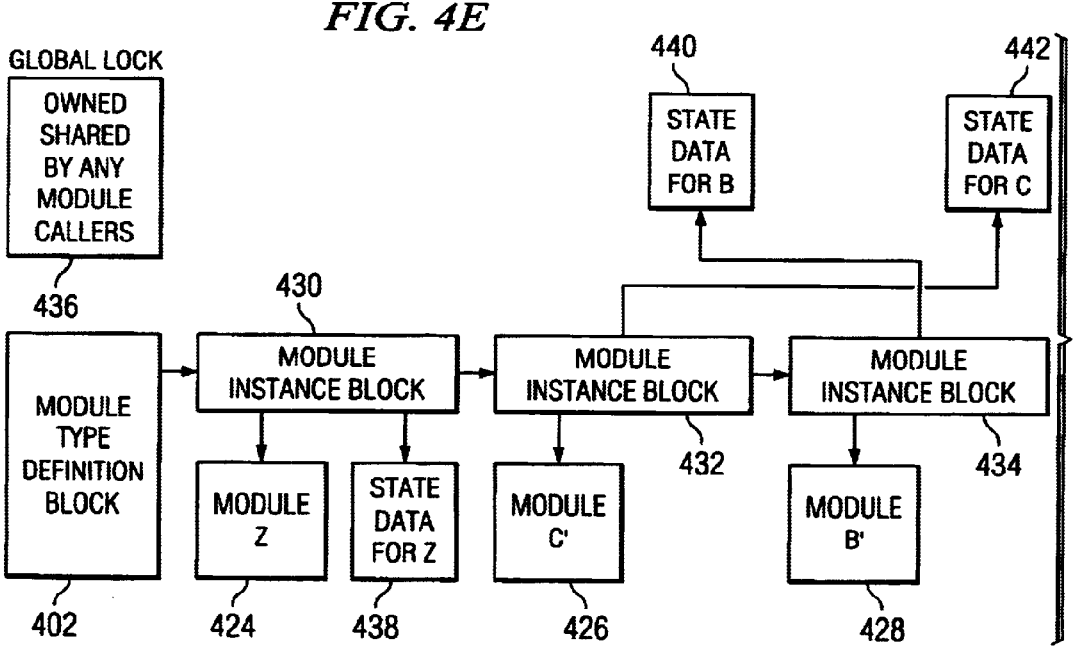

Referring to FIG. 4E, the final state of the in-memory representation of the old and new modules after the completion of steps 312 and 314 of the module refresh process is shown. First the global lock being held in exclusive mode is released at step 312. Next, the old module instance blocks, the old modules, and the state data for module A have been deleted at step 314. Finally, the global lock 436 is now available for module callers to obtain in shared mode. Note that at the end of the process, the state data for module C and B has been preserved so that the new modules are working with the same data.

The embodiments as described above provides several significant advantages in terms of system availability, atomicity of changes and updates, preservation of state data, and overall performance of the system. These advantages can be had in many different embodiments over many different hardware and software architectures as will be appreciated by one skilled in the art and while an exemplary embodiment such as that shown here using IMS may have constraints imposed on its implementation due to its environment, these constraints are not to be read as limitation to the breadth of the invention. Following is more detail regarding some of the advantages:

System availability: Changes can be applied to one module or a set of modules without requiring the shutdown and restart of an actively running program or system (typically, such a shutdown are restart are required to re-load updated copies of such modules), or without requiring a manual quiesce of the system prior to updating the modules (again, a typical procedure which causes a disruption or outage in the system).

Atomicity of Changes: Often, a change to a program is spread across several program modules, and all modules must be updated simultaneously to correctly effect the change. With this method, all modules are refreshed in a way that makes the updates appear to be simultaneous by preventing access to the modules until the refresh is completed.

Automatic preservation of State Information: Modules, when refreshed, get access to state information from previous instances of the modules with no extra work or code on the part of the modules themselves.

Performance: Modules are loaded and kept in memory. Calls to the modules are made through a service which knows the addresses of the modules and can call them directly, rather than incurring the overhead of loading them from disk or other long-term storage. This service can delay calls to the modules during refresh processing; otherwise, execution continues to the target modules without interruption.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or "step for."

What is claimed is:

1. A method for dynamically refreshing software modules within an actively running computer system comprising:

loading at least one new module into memory;

if the at least one new module corresponds to an existing module having state data associated therewith in memory, pointing the at least one new module to the corresponding state data already existent in memory;

locking execution of the existing modules from other processes;

changing call references from the at least one existing module to the corresponding at least one new module; and unlocking execution so that the at least one new module is now executed instead of the at least one existing module.

2. A method for dynamically refreshing software modules within an actively running computer system comprising:

providing a service to access one or more modules with call point access defined by a module type having status information indicating the one or more modules and their order of execution, the service responding to a call indicating a module type by executing the indicated one or more modules in the specified order;

refreshing the modules according to the module type status information, said refreshing comprising:

loading, into memory, modules indicated in the status information;

chaining together the newly loaded modules for execution in the order indicated by the module type status information;

if any newly loaded modules correspond to existing modules having state data associated therewith in memory, pointing such the new modules to corresponding state data already existent in memory;

locking execution of existing modules in memory corresponding to the module type;

changing call references to the newly loaded modules; and unlocking execution so that the newly loaded modules are executed instead of the existing modules.

3. The method as recited in claim 2 wherein the module type status information indicates a different execution order for the existing modules of the module type.

4. The method as recited in claim 2 wherein at least one of the newly loaded modules does not correspond to an existing module so that modules are added to the module type.

5. The method as recited in claim 2 wherein at least one of the newly loaded modules corresponds to an existing module so that modules are updated.

6. The method as recited in claim 2 wherein at least one of the newly loaded modules corresponds to an existing module that has state data associated therewith in memory and further comprises pointing such the newly loaded modules to the corresponding state data already existent in memory.

7. The method as recited in claim 2 wherein the module type status information indicates different modules than the existing modules so that modules are deleted.

8. The method as recited in claim 2 wherein modules are loaded into memory only if there is not a corresponding existing module.

9. The method as recited in claim 2 wherein all modules indicated in the module type status information are loaded.

10. The method as recited in claim 2 wherein refreshing of modules is done periodically.

11. The method as recited in claim 2 wherein refreshing of modules is done based on any change to the module type status information.

12. The method as recited in claim 2 wherein modules are chained together by a linked list of one or more module instance blocks, wherein each module instance block has a reference to the corresponding module itself, and wherein the provided service will execute the modules of a module type by traversing the linked list of module instance blocks to access the individual modules.

13. A computer program product comprising:

a computer usable medium;

computer readable instructions embodied on said computer useable medium for dynamically refreshing software modules within an actively running computer system, the instructions directing a computer to perform the steps of:

loading at least one new module into memory;

if the at least one new module corresponds to an existing module having state data associated therewith in memory, pointing the at least one new module to the corresponding state data already existent in memory;

locking execution of the existing modules from other processes;

changing call references from the at least one existing module to the corresponding at least one new module; and unlocking execution so that the at least one new module is now executed instead of the at least one existing module.

14. A computer program product comprising:

a computer usable medium;

computer readable instructions embodied on said computer useable medium for dynamically refreshing software modules within an actively running computer system, the instructions directing a computer to perform the steps of:

providing a service to access one or more modules with call point access defined by a module type having status information indicating the one or more modules and their order of execution, the service responding to a call indicating a module type by executing the indicated one or more modules in the specified order;

refreshing the modules according to the module type status information, said refreshing comprising:

loading, into memory, modules indicated in the status information;

chaining together the newly loaded modules for execution in the order indicated by the module type status information;

if any newly loaded modules correspond to existing modules having state data associated therewith in memory, pointing such the new modules to corresponding state data already existent in memory;

locking execution of existing modules in memory corresponding to the module type;

changing call references to the newly loaded modules; and unlocking execution so that the newly loaded modules are executed instead of the existing modules.

15. A computer program product as recited in claim 14 wherein the module type status information indicates a different execution order for the existing modules of the module type.

16. A computer program product as recited in claim 14 wherein at least one of the newly loaded modules does not correspond to an existing module so that modules are added to the module type.

17. A computer program product as recited in claim 14 wherein at least one of the newly loaded modules corresponds to an existing module so that modules are updated.

18. A computer program product as recited in claim 14 wherein at least one of the newly loaded modules corresponds to an existing module that has state data associated therewith in memory and further comprises pointing such the newly loaded modules to the corresponding state data already existent in memory.

19. A computer program product as recited in claim 14 wherein the module type status information indicates different modules than the existing modules so that modules are deleted.

20. A computer program product as recited in claim 14 wherein modules are loaded into memory only if there is not a corresponding existing module.

21. A computer program product as recited in claim 14 wherein all modules indicated in the module type status information are loaded.

22. A computer program product as recited in claim 14 wherein refreshing of modules is done periodically.

23. A computer program product as recited in claim 14 wherein refreshing of modules is done based on any change to the module type status information.

24. A computer program product as recited in claim 14 wherein modules are chained together by a linked list of one or more module instance blocks, wherein each module instance block has a reference to the corresponding module itself, and wherein the provided service will execute the modules of a module type by traversing the linked list of module instance blocks to access the individual modules.

25. A sub-system for dynamically refreshing software modules within an actively running computer system, the sub-system comprising:

a means for loading at least one new module into memory;

if the at least one new module corresponds to an existing module having state data associated therewith in memory, a means for pointing the at least one new module to the corresponding state data already existent in memory;

a means for locking execution of the existing modules from other processes;

a means for changing call references from the at least one existing module to the corresponding at least one new module; and a means for unlocking execution so that the at least one new module is now executed instead of the at least one existing module.

26. A sub-system for dynamically refreshing software modules within an actively running computer system, the sub-system comprising:

a means for providing a service to access one or more modules with call point access defined by a module type having status information indicating the one or more modules and their order of execution, the service responding to a call indicating a module type by executing the indicated one or more modules in the specified order;

a means for refreshing the modules according to the module type status information, said refreshing comprising:

a means for loading, into memory, modules indicated in the status information;

a means for chaining together the newly loaded modules for execution in the order indicated by the module type status information;

if any newly loaded modules correspond to existing modules having state data associated therewith in memory, a means for pointing such the new modules to corresponding state data already existent in memory;

a means for locking execution of existing modules in memory corresponding to the module type;

a means for changing call references to the newly loaded modules; and a means for unlocking execution so that the newly loaded modules are executed instead of the existing modules.

27. The sub-system as recited in claim 26 wherein the module type status information indicates a different execution order for the existing modules of the module type.

28. The sub-system as recited in claim 26 wherein at least one of the newly loaded modules does not correspond to an existing module so that modules are added to the module type.

29. The sub-system as recited in claim 26 wherein at least one of the newly loaded modules corresponds to an existing module so that modules are updated.

30. The sub-system as recited in claim 26 wherein at least one of the newly loaded modules corresponds to an existing module that has state data associated therewith in memory and further comprises pointing such the newly loaded modules to the corresponding state data already existent in memory.

31. The sub-system as recited in claim 26 wherein the module type status information indicates different modules than the existing modules so that modules are deleted.

32. The sub-system as recited in claim 26 wherein modules are loaded into memory only if there is not a corresponding existing module.

33. The sub-system as recited in claim 26 wherein all modules indicated in the module type status information are loaded.

34. The sub-system as recited in claim 26 wherein refreshing of modules is done periodically.

35. The sub-system as recited in claim 26 wherein refreshing of modules is done based on any change to the module type status information.

36. The sub-system as recited in claim 26 wherein modules are chained together by a linked list of one or more module instance blocks, wherein each module instance block has a reference to the corresponding module itself, and wherein the provided service will execute the modules of a module type by traversing the linked list of module instance blocks to access the individual modules.

\* \* \* \* \*